US006768116B1

(12) United States Patent
Berman et al.

(10) Patent No.: US 6,768,116 B1
(45) Date of Patent: Jul. 27, 2004

(54) REAL-TIME REMOTELY PROGRAMMABLE RADIOACTIVE GAS DETECTING AND MEASURING SYSTEM

(75) Inventors: Michael F. Berman, Ansonia, CT (US); Herbert R. Gram, Madison, CT (US); Randolph L. Boncek, Hamden, CT (US); Linda A. Averill, West Haven, CT (US)

(73) Assignee: Remote Data Technologies, LLC, New Haven, CT (US)

( * ) Notice: Subject to any disclaimer, the term of this patent is extended or adjusted under 35 U.S.C. 154(b) by 0 days.

(21) Appl. No.: 10/138,670

(22) Filed: May 3, 2002

Related U.S. Application Data
(60) Provisional application No. 60/288,947, filed on May 4, 2001.

(51) Int. Cl.[7] .............................................. G01N 27/64
(52) U.S. Cl. ....................................... 250/380; 250/374
(58) Field of Search ................................ 250/374, 379, 250/380, 253, 255, 474.1

(56) References Cited

U.S. PATENT DOCUMENTS

| | | | |
|---|---|---|---|
| 4,140,912 A | * 2/1979 | Bressan et al. | 250/435 |
| 4,853,536 A | 8/1989 | Dempsey et al. | 250/253 |
| 4,871,914 A | 10/1989 | Simon et al. | 250/370.02 |
| 4,926,053 A | 5/1990 | Dempsey et al. | 250/376 |
| 4,992,658 A | 2/1991 | Ramsey, Jr. et al. | 250/253 |
| 5,107,108 A | * 4/1992 | Ramsey et al. | 250/253 |
| 5,128,540 A | 7/1992 | Stieff | 250/255 |
| 5,138,869 A | * 8/1992 | Tom | 73/31.03 |
| 5,281,824 A | * 1/1994 | MacArthur et al. | 250/380 |

OTHER PUBLICATIONS

Rad Elec Inc., *The E–PERM™ System, Electret–Passive Environmental Radon Monitor*, Rad Elec Inc., 5330J Spectrum Drive, Frederick, MD 21701, telephone (301) 694–001, 4 pp.

* cited by examiner

*Primary Examiner*—Constantine Hannaher
*Assistant Examiner*—Timothy J. Moran
(74) *Attorney, Agent, or Firm*—Wiggin and Dana LLP; Gregory S. Rosenblatt; Michael K. Kinney

(57) ABSTRACT

A system is presented for remotely measuring a concentration of a target material (e.g., radioactive gas, suspended aerosols or non-radioactive gaseous chemistries). The system includes a data processing system and a monitoring device. The device includes a detector having a chamber, collector in the chamber and a sensor. The target material enters the chamber. The collector collects ions generated by decay of the material. In one embodiment, the sensor measures changes in an electrostatic potential of the collector in response to the ions. In another embodiment, the sensor includes a scintillation counter that measures alpha or beta particles and provides an energy spectrum. In another embodiment, the sensor includes a material whose optical properties vary according to fields formed within the sensor. The device includes a transmitter for transmitting the potential, the spectrum or the field strength to the processing system for determining the concentration of the target material.

13 Claims, 8 Drawing Sheets

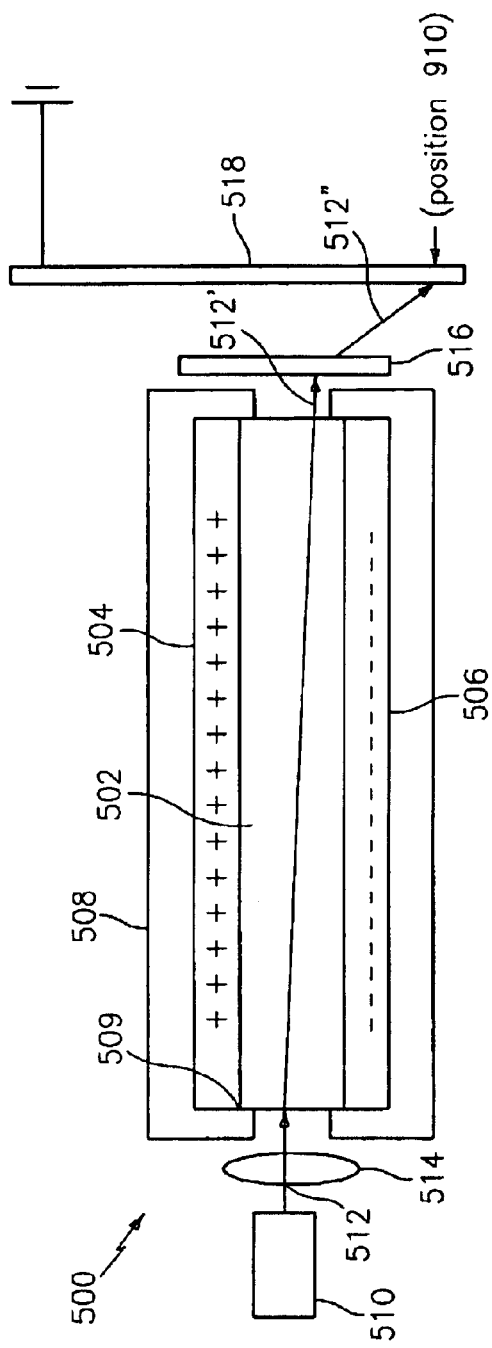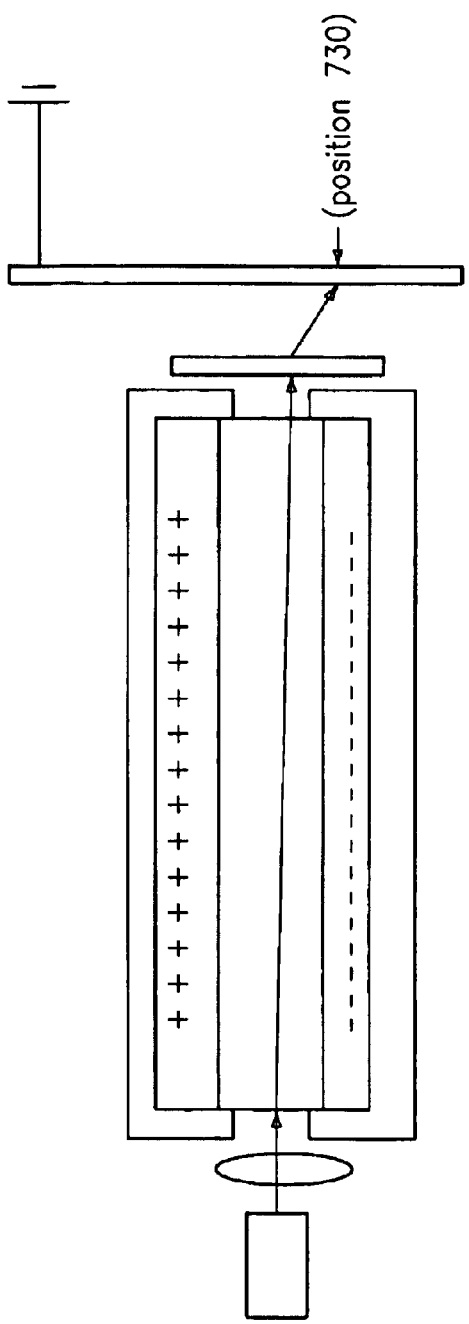

REAL-TIME REMOTELY PROGRAMMABLE RADIOACTIVE GAS DETECTING AND MEASURING SYSTEM

CROSS REFERENCE TO RELATED APPLICATIONS

Priority is herewith claimed under 35 U.S.C. §119(e) from copending U.S. Provisional Patent Application Serial No. 60/288,947, filed May 04, 2001, entitled "REAL-TIME REMOTELY PROGRAMMABLE RADON DETECTING AND MEASURING DEVICE", by Michael F. Berman et al. The disclosure of this U.S. provisional patent application is incorporated by reference herein in its entirety.

FIELD OF THE INVENTION

This invention relates generally to analytical testing of chemical and physical properties and their changes within an area under test (AUT). In particular, the invention relates to systems and methods for measuring and monitoring concentrations of radioactive gases such as radon, thoron and other materials within a gaseous environment of the AUT in-situ by spectroscopic and/or electrostatic means.

BACKGROUND OF THE INVENTION

There are numerous devices presently available for detecting the presence of radioactive gas (e.g., radon) within an environment. Such devices, for example, are illustrated in U.S. Pat. No. 4,992,658, issued Feb. 12, 1991 (the '658 patent) and U.S. Pat. No. 5,107,108, issued Apr. 21, 1992 (the '108 patent), both to Ramsey et al. The disclosure of these U.S. patents are incorporated by reference herein in their entireties. The radon monitoring device disclosed in the '658 patent includes a housing having an electret ion chamber. A technician locates the device in an environment to be monitored and opens a cover of the housing to permit radon in the environment to enter the electret ion chamber by diffusion. As the radon decays, radiation emitted by the decay process of the radon gas generates ions in the air inside of the electret ion chamber. The electret, having been pre-charged with a positive polarity, attracts the electrons (negative ions) to its surface. Every ion that is collected by the electret surface results in a reduction of charge in the electret. Measurements of a surface voltage, an indication of charge, of the electret before and after exposure to radon may be utilized to determine the concentration of radon encountered during exposure. For example, exposure to a predetermined concentration of radon over a predetermined period of time is known to result in the electret discharging by a defined amount of voltage. By recording a period of time of an actual exposure and the resulting discharge of voltage (e.g., surface voltage measured prior to exposure minus surface voltage measured after the exposure), an average concentration of radon within an environment of interest may be determined. The above described calculation assumes accurate knowledge of the initial electret charge and an ideal electret having no leakage or other loss of charge due to factors other than from exposure to radon.

Another device referred to as a continuous radon detector is described in U.S. Pat. No. 4,871,914, issued Oct. 3, 1989, to William E. Simon et al. (the '914 Patent). The '914 Patent describes an electronic detector that uses a diffused-junction photodiode sensor to measure alpha particles. The device reports radon gas levels electronically after a given period of time (e.g., a total count of alpha particles). Other conventional electronic radiation detector devices include a thallium activated cesium iodide scintillation crystal coated over a silicon pin diode or photodiode. Another conventional detector consists of a silver activated zinc sulfide scintillation crystal coated over a silicon pin diode.

A perceived disadvantage of these devices is that they typically require physical human intervention during the test period. The inventors have realized that the perceived disadvantage may be remedied by employing telemetry and/or cellular communication for transmitting data in virtual time mode. As such, physical human intervention can be avoided.

The inventors have further realized a number of deficiencies in the current testing procedures and devices. In conventional systems, a technician typically visits a test site and operates the measuring device more than once so that actual measurements for determining a concentration of radon in the test site can be taken. For example, a technician initiates a test by physically setting the device in an area of the test site and exposes the measuring device (e.g., the detector or absorbing surface of the device) to the test area (e.g., atmosphere within the area of the test site). To complete the test, the technician returns to the test site and retrieves the measuring device so that the measurement and calculation can be performed. For some units, the technician performs the measurement calculation at the test site. In other units, the technician carefully tranports the measuring device to a testing facility where the measurement and calculations are made.

When testing procedures include the utilization of a device having a charcoal canister collector, a qualified technician completes the testing by completely sealing the canister and returns the canister to a test facility. At the test facility a gamma counter is use to measure an amount of gamma radiation emitted from a Pb-214 isotope generated by the adsorbed radon gas. When testing procedures include the use of a continuous monitoring device such as alpha or gamma sensors, a qualified individual completes the test by returning to the test site so that the sensor can be read and the measurements interpreted. When the measuring device includes an electret, leakage due to cleanliness of a housing enclosing the electret, humidity and other factors related to multiple handling of the device affects the "as measured" parameters. Referring again to the charcoal canister device, trapped radioactive constituents are time dependent, as such the accuracy of the "as measured" value is a function of the amount of time required to return the canister to a certified laboratory for measurement. Furthermore, the radioactive decay of radon and its progeny further increase the error of accuracy when there is a delay in performing measurement calculations. In recognition of the possibility of such inaccuracies the Environmental Protection Agency (EPA) has published correction factors to account for different time periods between collection and measurement (e.g., delayed measurement calculation). An example of such an EPA publication is EPA 520/5-87-005, June, 1987, EERF Standard Operating Procedures for Radon-222 Measurement Using Charcoal Canisters, D. J. Gray, S. T. Windham, March, 1987.

It should be appreciated that human intervention in monitoring procedures, whether an intended or unintended (e.g., tampering with the device) step of the procedures, have been known to introduce errors in the obtained results. Therefore, it is preferable to minimize such intervention by limiting the number of times that a technician returns to the test site. Additionally, it should be appreciated that it is often cumbersome, inconvenient and/or inefficient for personnel (e.g., the technician) to go back to the testing site in order to perform final readings and/or retrieve a monitoring device for measurement at the test facility. Also, not every attempt to test an environment of interest is initially successful. A number of factors including, for example, failure of the monitoring device itself, misuse or tampering by non-certified persons at the test site may result in the need for another test. Such misuse or tampering can be, for example, an intentional or unintentional interruption resulting from a non-technician altering one or more parameters of the test procedures. As a result, a qualified technician would be required to revisit the test site, install a new device (or correct parameters of the current device) and initiate another test cycle.

In view of the foregoing, the inventors have realized that a need exists for a monitoring system that performs site specific collecting, detecting and measuring operations, substantially independent of conditions not directly related to the radioactive gas and suspended aerosols present at the test site, and that is capable of transmitting continuous or discrete results of measuring operations to a remote facility for real-time analysis. Additionally, the inventors have realized that it would be advantageous to employ a device that is responsive to control signals transmitted from, for example, the remote monitoring facility. The control signals may alter one or more parameters during, for example, a pre-test phase of the detecting and measuring operations, to improve the accuracy of the test results.

Accordingly, the present invention provides improved methods and apparatus for collecting, detecting and measuring radioactive gases (e.g., radon) and suspended aerosols within an environment of interest that addresses the above described and other perceived deficiencies in conventional monitoring devices.

OBJECTS AND ADVANTAGES OF THE INVENTION

It is an object and advantage of this invention to provide an improved system for collecting, detecting and measuring radioactive gases (e.g., radon) and suspended aerosols within an environment of interest.

It is another object and advantage of this invention to provide an analytical testing method having the ability to remotely measure and monitor chemical and physical properties and their changes within an environment of interest.

It is another object and advantage of this invention to provide a programmable monitoring device that includes a sensor for collecting ions generated by a decay of a radioactive gas, a detector for selectively measuring a change in an electrostatic potential of the sensor due to the collected ions, a microprocessor and a transmitter for transmitting the measured changes to a data processing system for real-time and/or virtual real-time analysis of the changes to determine a concentration of the radioactive gas or suspended aerosols within an environment of interest.

It is yet another object and advantage of this invention to provide a programable monitoring device that includes a sensor for collecting ions generated by a decay of a radioactive gas, a detector for selectively measuring radioactive particles or electromagnetic radiation of a given energy, a microprocessor and a transmitter for transmitting the measured changes to a data processing system for real-time and/or virtual real-time analysis of the changes to determine a concentration of the radioactive gas or suspended aerosols within an environment of interest.

It is still another object and advantage of this invention to provide a programmable monitoring device having the aforementioned sensor, detectors, microprocessor and transmitter, and that also includes a receiver for receiving signals from the data processing system. The signals including parameters for adjusting the selective measuring process employed by the detector in response to, for example, preferred values of a frequency of measuring and a duration of testing that corresponding to the determined concentration of the radioactive gas.

It is another object and advantage of the invention to provide a remotely programmable device for real-time detection and measurement of a concentration of radioactive gas such as radon, thoron and other materials in-situ by spectroscopic and/or electrostatic means and which saves the lives of personnel by relaying virtually instantaneous information to appropriate personnel such that the proper action is taken long before complications develop.

Further objects and advantages of this invention will become more apparent from a consideration of the drawings and ensuing description.

SUMMARY OF THE INVENTION

The foregoing objects are realized by methods and apparatus in accordance with embodiments of this invention, wherein a system is presented for detecting and measuring a concentration of radioactive gas and suspended aerosol within an environment of interest. The system includes a testing facility having a data processing system and a monitoring device located within the environment of interest. The monitoring device is operatively coupled to the data processing system. For example, the monitoring system includes a radiotelephone or the like for accessing the data processing system via a conventional telecommunication system.

The monitoring device includes a detector having a housing that defines a chamber, a collector that is located within the chamber and a sensor electrically coupled to the collector. The housing includes at least one opening for allowing radioactive gas and suspended aerosol within the environment of interest to enter the chamber. The collector collects ions generated by a decay of radioactive gas and suspended aerosol within the chamber.

In one embodiment, the sensor selectively measures changes in an electrostatic potential of the collector in response to an accumulation of the generated ions. In another embodiment, the sensor includes a material disposed within either an electric or a magnetic field formed within the sensor. The material has optical properties that vary in response to changes in the formed field. Changes over time of the optical properties is representative of changing field strengths.

The monitoring device also includes a transmitter for transmitting, in one embodiment, the measured changes in the electrostatic potential to the data processing system. In another embodiment, the transmitter transmits the changing field strength to the data processing system. The data processing system includes application programming logic for determining the concentration of radioactive gas and suspended aerosol within the environment of interest from either of the measured changes in the electrostatic potential or the changing field strength.

BRIEF DESCRIPTION OF THE DRAWINGS

The above set forth and other features of the invention are made more apparent in the ensuing Detailed Description of the Preferred Embodiments when read in conjunction with the attached Drawings, wherein:

FIGS. 6A and 6B are block diagrams of a sensor for sensing changes in optical properties of a material and for measuring a change in an electric or magnetic field strength representing a concentration of a radioactive gas or suspended aerosol within an environment of interest.

Identically labeled elements appearing in different ones of the above-described figures refer to the same elements but may not be referenced in the description for all figures.

DESCRIPTION OF PREFERRED EMBODIMENTS OF THE INVENTION

Although a preferred embodiment of the invention uses a combination of a scintillation crystal material and a photo detector such as a silicon diode, it should be appreciated that other radiation detection concepts may be utilized that equally produce an electrical signal which, in accordance with the present invention, correspond to an amount of radioactive gas (e.g., radon) and/or suspended aerosol present in a given location The present inventors have realized that some conventional techniques for collecting and measuring the radioactive gas and suspended aerosol suffer from potential interference from other environmental conditions and lack specificity to the radioactive gas and/or suspended aerosols that are being detected. Where the presence of radioactive gas and suspended aerosols present a very serious health and well-being hazard (particularly due to high energy alpha particle emissions), the integrity of the test is paramount. One aspect of the present invention teaches that, for measurement integrity, the sensor device should be tamper proof and under the sole control of a qualified and certified analyst or trained technician. To address this concern, an individual qualified in the collection and interpretation of the collected data monitors the "as collected" data in real-time or virtual real time. Further, where there exists the possibility for gross differences in radiation levels between different locations under test and different times at the same location (cyclic radiation level profiles), provisions must be made to alter the data collection rates to eliminate the possibility of operation outside the acceptable range of the measuring sensor, and/or to determine if the monitoring sensor has been tampered with in such a manner as to compromise or invalidate the test. The inventors have found that to meet the above criteria it is preferable to maintain the continuous presence of a trained analyst at a centralized remote site and to implement a system for remotely transferring real-time data to the detector within the environment under test.

Figure 1:
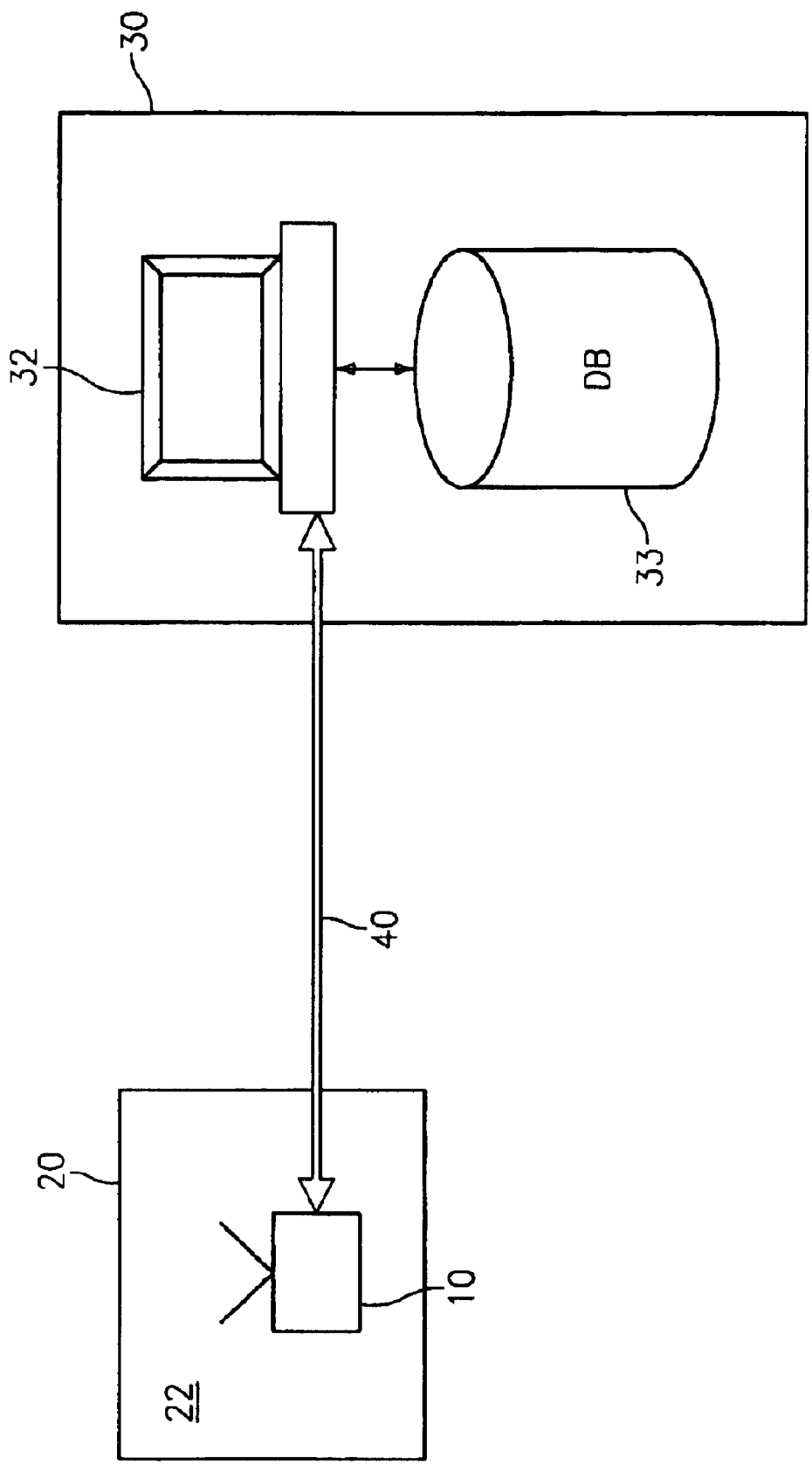
FIG. 1 is a simplified block diagram of a real-time, remotely programmable radioactive gas and suspended aerosol detecting and measuring system having a monitoring device deployed within an environment of interest.

FIG. 1 illustrates a radioactive gas (e.g., radon) and suspended aerosol detecting and measuring device 10 located within a facility of interest 20 such as, for example, a dwelling, commercial or education facility, or the like, to detect and measure a concentration of radioactive gas (e.g., radon) and/or suspended aerosols within an environment of interest, shown generally at 22. Preferably, the device 10 transits results of its detecting and measuring operations to a testing facility 30 and, in particular, a data processing system 32 located within the testing facility 30. The data processing system 32 receives signals 40 including the results and invokes processes executing on the data processing system 32 for determining, in real-time, a concentration of the radioactive gas or suspended aerosol within the environment of interest 22. In one embodiment, the determined concentrations are stored in a database 33 for access and retrieval at a time of interest. The device 10 may also transmit (e.g., via the signals 40) information regarding, for example, a status of the detecting and measuring operations, an occurrence of a predefined error condition, or other messages to notify personnel at the testing facility 30 of conditions within the environment of interest 22 so that corrective actions, if necessary, may be taken.

It should be appreciated that it is within the scope of the present invention for the signals 40 to be transmitted over a communication network having wired and/or wireless communication connections coupling the device 10 to the data processing system 32. Accordingly, the environment of interest 22 may, but need not, be located in proximity to the testing facility 30. The communication network may be a part of a landline telephone network, mobile, cellular or other radiotelephone, telemetry and satellite communication networks as well as part of a global communication network such as, for example, the Internet, an itranet and/or an extranet.

In one embodiment, the device 10 and data processing system 32 cooperate such that the signals 40 are bidirectional. As such, the signals 40 include control commands initiated by the data processing system 32 (or a transmitter coupled thereto) to the device 10. The control commands include, for example, instructions to: 1.) perform initial diagnostics and auto zero; 2.) initialize a desired test cycle; 3.) monitor the progress of a test; 4.) transmit results and/or values of one or more parameters of the detecting and measuring operations (as described below); and 5.) terminate a test or instruct the monitor to re-start a test cycle.

Figure 2:
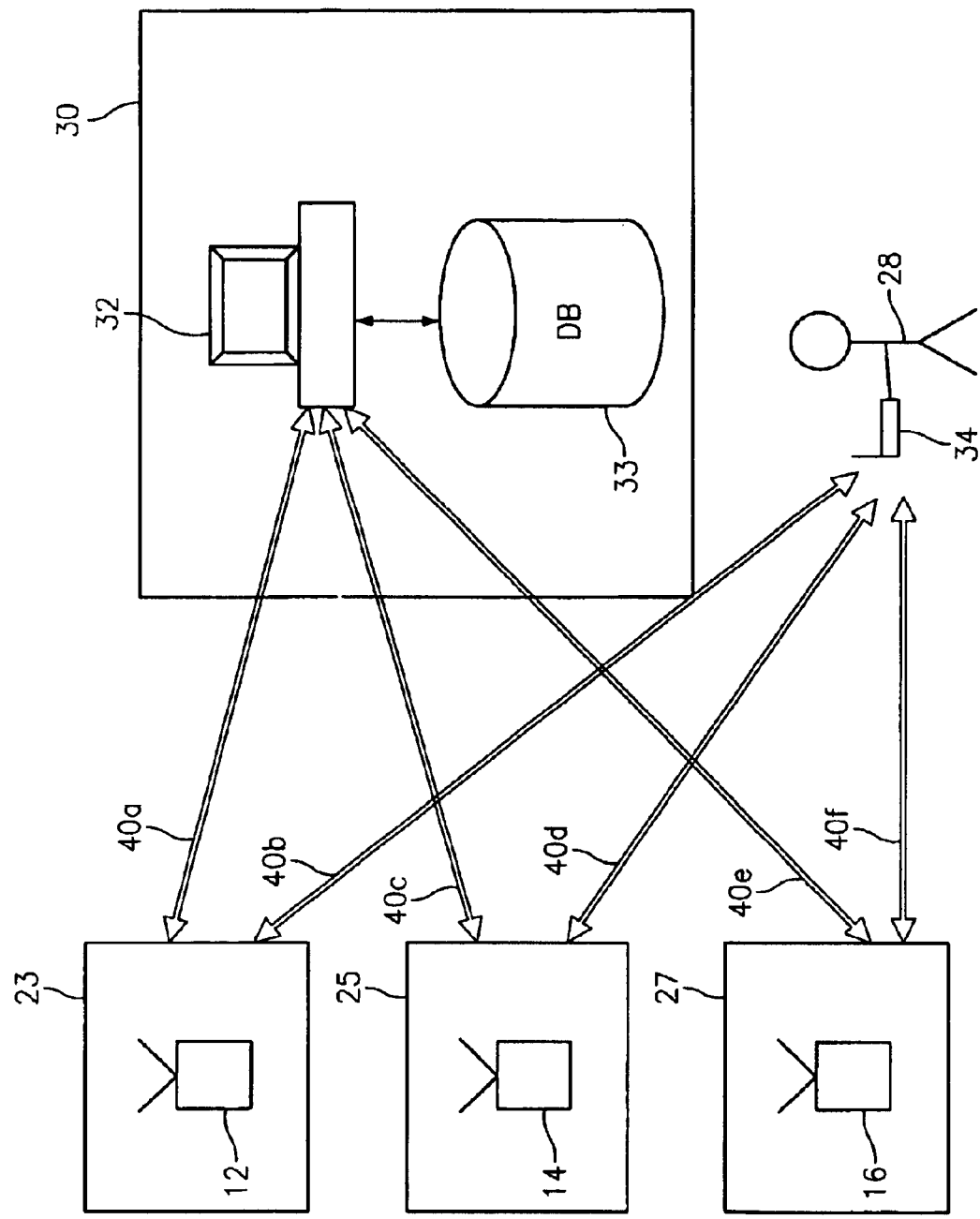
FIG. 2 is a simplified block diagram of a real-time, remotely programmable radioactive gas and suspended aerosol detecting and measuring system having a plurality of monitoring devices deployed within a plurality testing environments.

As shown in FIG. 1, the data processing system 32 may comprise, for example, a standalone or networked personal computer, work station or portable computing device such as a laptop or tablet computer, personal data assistant (PDA), or the like. The present invention also contemplates, as is shown in FIG. 2, that a plurality of radioactive gas (e.g., radon) and suspended aerosol detecting and measuring devices 12–16 (similar to device 10) located within a plurality of facilities of interest 23–27 communicate (via signals 40a–40f) with a central testing facility (e.g., the testing facility 30 of FIG. 1) and/or with a technician 28 carrying a portable data processing system 34 such as, for example, one of the aforementioned laptop computers and PDAs. One benefit of the portable data processing system 34 is the ability for the technician 28 to confirm the operation of one of the devices 12–16 during initial set-up of the device and/or for a supervising technician to randomly confirm that devices 12–16 were correctly placed and are operational without having to enter the individual facilities of interest 23–27. Operational devices are ones that capture radioactive gas (e.g., radon) and suspended aerosol, detect, measure and transmit a change in voltage or current from their sensor to the portable device 34 for analysis. In turn, the portable device 34 can determine proper operation of the device and/or a concentration of radioactive gas (e.g., radon) and suspended aerosol in the environment from the detected data (e.g., change in voltage/current).

Figure 3A:
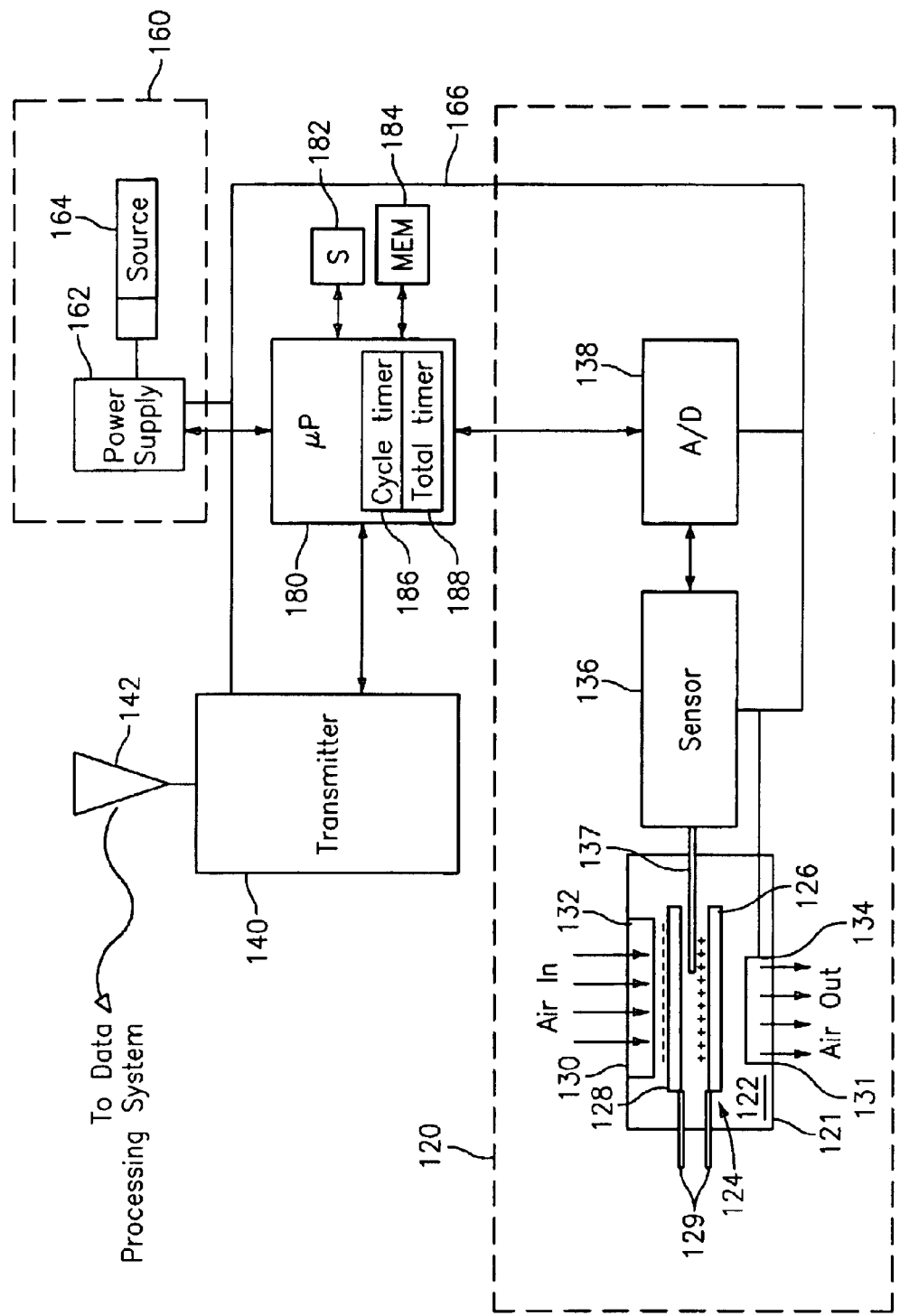
FIG. 3A is a block diagram of a monitoring device constructed and operating in accordance with a first embodiment of the present invention.
Figure 3B:
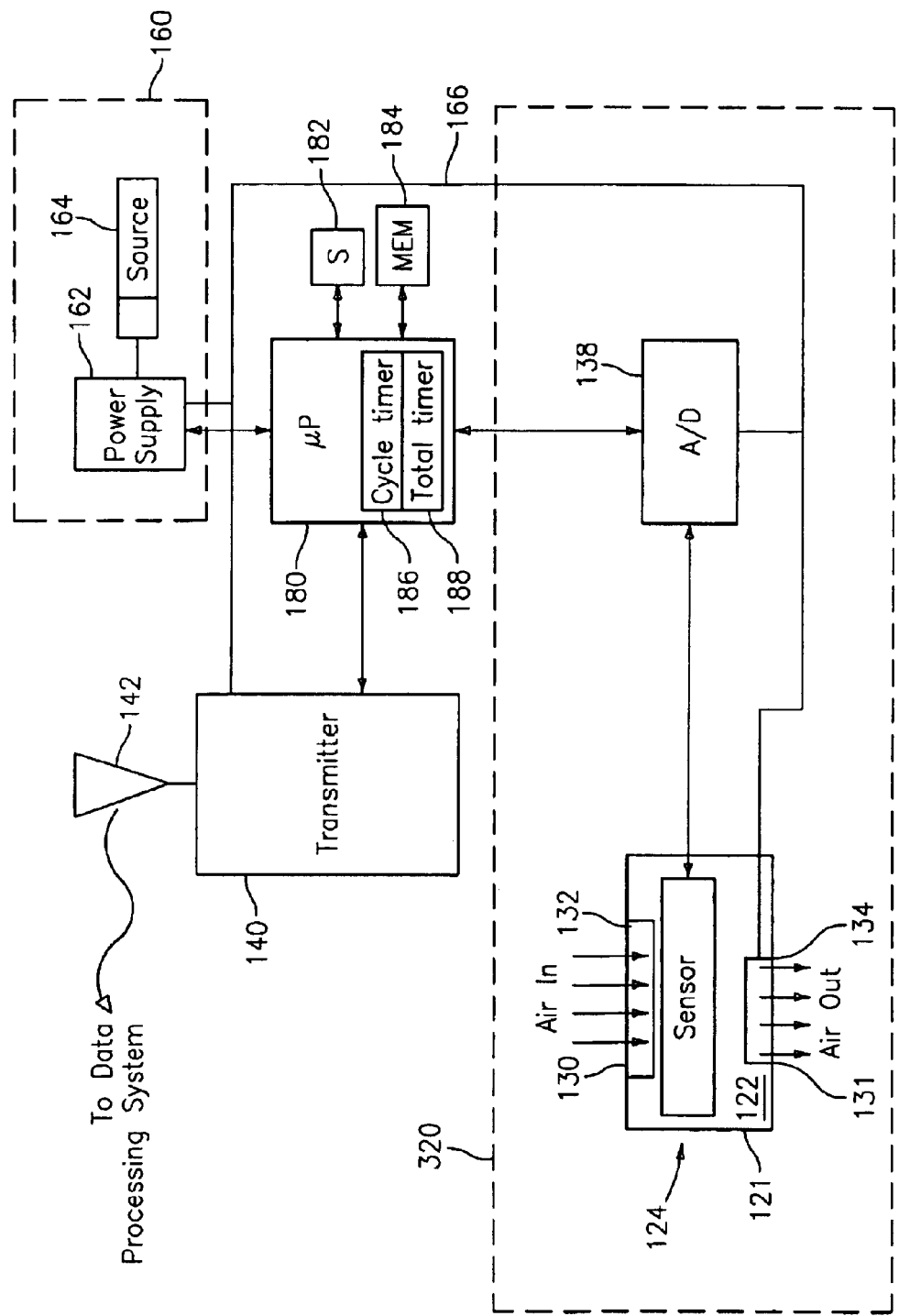
FIG. 3B is a block diagram of a monitoring device constructed and operating in accordance with a second embodiment of the present invention.

FIGS. 3A and 3B illustrate radioactive gas (e.g., radon) and suspended aerosol monitoring devices 100 and 300 constructed in accordance with two embodiments of the present invention. As shown in FIGS. 3A and 3B, devices 100 and 300 include real-time alpha and beta, or radioactive gas (e.g., radon) and suspended aerosol gas electronic detectors 120 and 320, a transmitter 140, a power supply 160 and a microprocessor ($\mu$P) 180.

As described in detail below preferred embodiments of the monitoring devices 100 and 300 include features and functions such that the devices 100 and 300 may be controlled from a remote location (e.g., the aforementioned remote testing facility 30). Additionally, the devices 100 and 300 may include features and functions for ensuring the integrity of the detecting and measuring operations (e.g., the monitoring operations) in view of intentional or unintentional interference with the monitoring operations. For example, in one embodiment, the devices 100 and 300 include a tilt switch or motion sensor for detecting movement of the devices 100 and 300. Movement may include, for example, knocking a device over, relocating a device within a test environment, or other such intentional or unintentional displacement. If such movement is detected the monitoring operations may be compromised so that the devices 100 and 300 may stop monitoring and require intervention before restarting monitoring operations, e.g., a manual reset or control signal instructing the devices 100 and 300 to restart. In this respect, the devices 100 and 300 may include a display device (e.g., a liquid crystal display) for exhibiting, for example, an error message indicating that monitoring has stopped due to a particular condition such as the aforementioned movement. It should be appreciated that other error conditions may stop monitoring operations. For example, an erroneous voltage measurement may be detected (e.g., a sharp increase) when immediately proceeding measurements have trended in an opposite direction (e.g., gradually decreasing). In one aspect of the invention, an error message is transmitted to the testing facility 30 upon the detection of at least one of the aforementioned error conditions. The testing facility 30 may then evaluate the condition and transmit a command back to the devices 100 and 300 to, for example, restart monitoring operations. Details of the communication between the devices 100 and 300 and the testing facility 30 are described below.

The microprocessor 180 controls the operation of and interaction between the detectors 120 and 320, the transmitter 140 and the power supply 160. In one embodiment, the microprocessor 180 includes a memory device (MEM) 184 such as, for example, RAM or electrically erasable programmable read only memory (EEPROM) devices, for storing system parameters, variables and intermediate measurements taken by the devices 100 and 300. One advantage of this system is that it can save all information even after power has been terminated and turned back on. The microprocessor 180 includes program logic and precision clocks for measuring the duration of one or more testing periods. A manual activation switch (S) 182 is coupled to the microprocessor 180. As described below, the activation switch 182 is depressed to begin operation of the devices 100 and 300. As noted above, a control signal may also be received that instructs the microprocessor 180 to begin operation. In one embodiment, once a test cycle has been initiated, all test parameters are controlled by the microprocessor 180 to prevent, for example, unauthorized intervention.

As shown in FIGS. 3A and 3B, the devices 100 and 300 are relatively non-complex units that incorporates inexpensive components for capturing radioactive gas (e.g., radon) and it suspended aerosol, detecting and measuring a change in current or voltage over time (e.g., a pulse rate) due to the detection of alpha and/or beta particles from the decaying radioactive gas. The device 100 and 300 transmits (via the transmitter 140 and an antenna 142) signals representing the detected and measured change as, for example, radio frequency or infrared communication signals to a remote receiver (e.g., the signals 40, 40a–40f sent to the data processing system 32 and/or the remote device 34 of FIGS. 1 and 2). The receiver converts the incoming signal from the remote sensing device via the use of translation specific algorithms as known to those skilled in the art.

Figure 5:
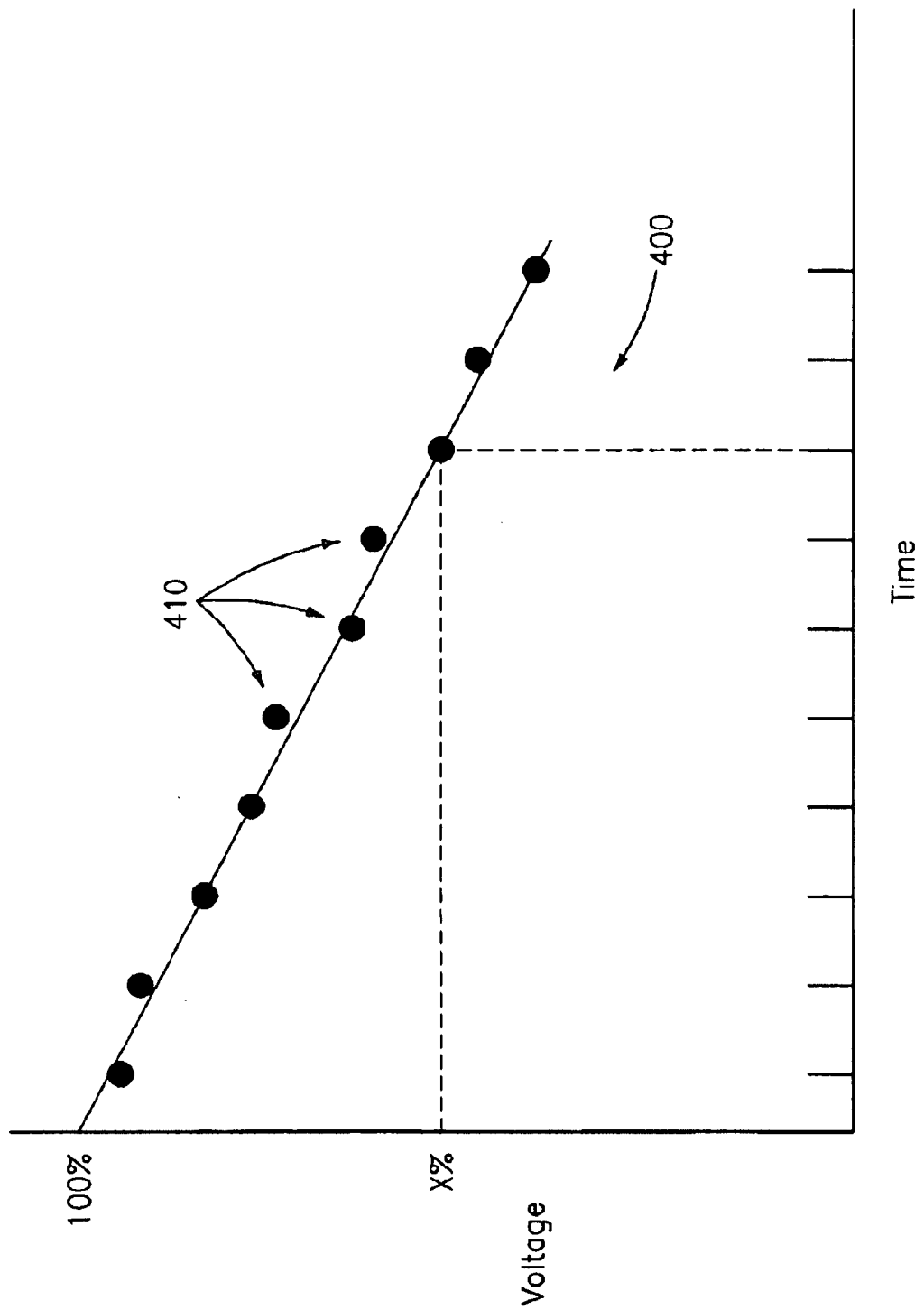
FIG. 5 is a graph of voltage or current data points versus time forming a depletion curve that is utilized in accordance with the present invention for determining a concentration of a radioactive gas or suspended aerosol within an environment of interest.

In one aspect of the present invention the device 100 and 300 transmits a plurality of detected and measured voltage or current readings (e.g., at least about five such readings) to the receiver (e.g., the data processing system 32). The data processing system 32 processes the plurality of readings by, for example, using them as data points 410 to form a depletion curve 400 as illustrated in FIG. 5. As should be appreciated, the depletion curve 400 graphically depicts a depletion in the voltage or current of the detector (e.g., detector 120 and 320) over time and indirectly corresponds to the decay of radioactive gas (e.g., radon) within the environment. As noted in the Background Section of this document, the voltage or current change over a predetermined time period permits a calculation of the concentration of radioactive gas (e.g., radon) within the environment of interest. In one embodiment, a data point labeled "X%" denotes a final voltage reading taken after several readings have been made over testing time period. Thus, an initial voltage reading is performed at the beginning of the test period at the environment of interest or remote site (e.g., a 100% data point) then a multiple of voltage readings are performed and sent to the receiver to measure and calculate the concentration of radioactive gas.

The inventors have realized that by accumulating more than the conventional two measurements (e.g., initial and final readings taken by conventional devices similar to those described in the '658 Patent and the '108 Patent) a depletion curve can provide a metric for determining the validity of, for example, the geographic location of the monitoring device within the environment of interest and of the voltage or current readings for calculating an accurate concentration of radioactive gas (e.g., radon) within the environment of interest. Preferably, at least five voltage or current readings are taken. For example, the validity of readings can be voided when one of the data points on the depletion curve is in sharp contrast to a trend in the curve such as the above described error condition when a sharp increase in voltage or current is read after a series of gradually decreasing readings have been taken.

Referring again briefly to FIG. 2, the receiver may receive signals (e.g., signals 40a–40f) 0for many devices (e.g., device 12–16) located at different environments of interest (e.g., facilities 23–27). Accordingly, the receiver and translation algorithms are capable of processing multiple test data points received from multiple devices 100 and 300 (e.g., the receiver permits multi-channeling). Additionally, by communicating data to a testing facility the accuracy of a plurality of tests at a plurality of testing environments are monitored without individually accessing the plurality of testing environments to physically gather the test data.

Referring again to FIG. 3A, the detector 120 includes a housing 121 defining an ionization chamber 122 and a sensor, shown generally at 124, disposed in the chamber 122. In one aspect of the present invention (shown in FIG. 3A), the sensor 124 includes a collector (e.g., an electret) having two conductive surfaces 126 and 128. The surfaces 126 and 128 are separated by a thin dielectric space and, in one embodiment, are each coated by a thin dielectric material. The two conductive surfaces 126 and 128 are charged at opposite polarities at a given voltage. For example, as shown in FIG. 3A, surface 126 is positively charged and surface 128 is negatively charged. Thus, an electric field is created between the surfaces 126 and 128.

In one embodiment, the sensor 124 includes insulated charging connectors 129 coupled to the two conductive surfaces 126 and 128. The connectors 129 are selectively coupled to a power supply (described below) of the device 100. Upon command, for example, by depression of a manual switch or upon receipt of a control signal from the testing facility 30, the microprocessor 180 couples the power supply to the connectors 129 so that the sensor 124 is recharged. Periodic recharging of the sensor 124 can provide for substantially continual detecting and measuring operations (as described below) within the environment of interest. In this embodiment a relatively high voltage power supply (such as is seen in, for example, disposable cameras) may be employed to recharge the sensor 124.

Radioactive gas (e.g., radon) and suspended aerosol within the testing environment passively diffuses into the chamber 122 through a first opening 130 in the housing 121. Preferably, a filter 132 is disposed within the first opening 130. The filter 132 filters out moisture and other unwanted particles from entering the chamber 122 through the opening 130. Preferably, the housing 121 includes a second opening 131 having a device 134 disposed therein. The device 134 circulates the atmosphere within chamber 122 and includes, for example, an air moving device. When activated, for example, during a test period, the air moving device 134 provides a substantially constant airflow through the chamber 122. The inventors have realized that a substantially constant, or at least a controllable airflow, minimizes inaccuracies that may be introduced by varying environmental conditions within typical testing environments. The inventors have found that the active movement of the air sample within the chamber 122 assures a greater representation of the area under test. For example, if a device is placed against a wall or in a confined location of the subject facility, less accuracy may be realized. As a result, the present invention minimizes inaccuracies introduced when less experienced technicians place devices at random within testing environments. It is also within the scope of the present invention to employ other methods for providing the constant airflow through the chamber 122 during test periods. For example, a mechanical device such as the above-mentioned air moving device may place undesirable power requirements on the device 100 and 300. Therefore, the present invention may employ non-mechanical means such as, for example, gradient heating and/or electrostatic focussing (e.g., wind produced by ionized air), to achieve a constant flow of air through the chamber 122.

In one embodiment, the detector 120 also includes a second sensor 136 for measuring a decrease in the voltage or current of the sensor 124 (e.g., the electret) due to the decay of radioactive gas (e.g., radon) and suspended aerosol within the chamber 122. For example, the second sensor 136 may be a micro electrometer that reads an electrostatic potential of the electric field at a given position between the conductive surfaces 126 and 128. A sensing electrode or wire 137 is positioned either in between the conductive layers or very near the conductive surfaces 126 and 128. The sensing electrode 137 is coupled to the second sensor 136 (e.g., the micro electrometer) such that the electrostatic potential of the electric field between the surfaces 126 and 128 can be detected by the electrometer. An alternate sensor 136 may be an electrostatic reader that can measure an electrostatic potential on a charged surface through space without physical contact to that surface but at a constant specific distance from the surface being measured.

In a second aspect of the present invention (shown in FIG. 3B), the detector 320 includes a sensor 124 comprised of a Kerr Cell, a Pockel Cell or a Faraday Cup. In accordance with this aspect of the present invention, changes in optical properties of a material resulting from a surrounding electric or magnetic field allows the measurement of radioactive gas (e.g., radon) present in an environment. FIG. 3B illustrates the sensor 124 disposed within the chamber 122 and exposed to radioactive gas (e.g., radon) within the test environment as the radon passively diffuses into the chamber 122 and sensor 124. In one embodiment, illustrated in FIGS. 6A and 6B, the sensor 124 is comprised of a Pockel Cell sensor 500 wherein a change in the index of refraction of a material is utilized to measure a change in the electric field strength or voltage within the chamber 122. The sensor 500 includes a material 502 having refractive index that varies when exposed to a change in an electric field strength or voltage. Suitable materials include, for example, a birefringent cut potassium dihydrogen bromide crystal ($KH_2PO_4$ or $KD_2PO_4$), or a material having similar physical properties such as, for example, lithium neobidium crystal ($LiNbO_3$) or nitrobenzene. The material 502 is sandwiched between two oppositely polarized charged surfaces 504 and 506. For example, the charged surfaces 504 and 506 may be charged within a range of about 200 to 2000 volts between them. As such, an electric field is formed between the charged surfaces 504 and 506.

Preferably, the surfaces 504 and 506 are thin layers coupled on to opposite sides of the material 504 (e.g., the birefringent crystal) to form a layered assembly. The assembly is impregnated into a dielectric material 508 having a thin barrier layer of about 0.01 to 100 nm Suitable dielectrics include polycarbonate materials such as, for example, a highly pure TEFLON® block (TEFLON® is a registered trademark of E.I. du Pont De Nemours and Company Corporation). Alpha and beta particles from within the chamber 122 penetrate the conductive surface layers 504 and 506 of the birefringent material 502. A light source 510 radiates a beam 512 through the birefringent material 502. Preferably, a collimating lens 514 focuses the beam 512 such that it is substantially parallel as it enters the material 502. A path of the beam 512 through the material 502 changes from substantially parallel, when entering the material 502, to a path offset from its initially parallel path due to a refractive index of the material 502. A lens 516 is disposed at an end of the material 502 opposite to the end in which the beam 512 enters the material 502. The lens 516, preferably an objective lens, receives an offset beam 512' exiting the material 502 and focuses it upon a charge coupling device (CCD) 518. The CCD 518 is pixelized (e.g., includes an N×M matrix of pixels) such that a location of an impinging beam 512" on the CCD 518 is detectable. A counter (not shown) is coupled to the CCD 518 to detect the pixel at which the beam 512" impinges the CCD 518. Each pixel within the N×M matrix is correlated to a specific voltage. As such, a voltage of the electric field is determined indirectly from the deformation of the beam 512 (e.g., angle at which the beam is bent) as the beam 512 travels through the material 502.

It should be appreciated that as alpha and beta particles from the radioactive gas (e.g., radon) and suspended aerosol decaying within the chamber 122 bombard the birefringent material 502, the electric field formed by the charged surfaces 504 and 506 is depleted by the ions emitted by the decaying radioactive gas (e.g., radon) and suspended aerosol. As such, the refractive index of the material 502 is altered due to the change in the strength of the electric field. As the field strength (e.g., voltage) drops the path of the beam 512 through the material 502 changes. As shown in FIGS. 6A and 6B a change in electric field strength results in a change in a position at which the beam 512" impinges the CCD 518, e.g., the beam 512" position changes from position 910 in FIG. 6A to a position 730 in FIG. 6B. By detecting (with the CCD 518 and counter) these changes over time, a change in strength of the electric field is detectable. As noted above, the change in the electric field strength is utilized to determine the concentration of radioactive gas (e.g., radon) and suspended aerosol within the environment of interest.

In another embodiment, a Kerr Cell sensor 124 may be based on the Kerr Effect in which changes in light intensity of the beam due to changing electric field strength may be detected. Alternatively, the sensor 124 may employ the Faraday Effect Accordingly, it should be appreciated that it is within the scope of the present invention to indirectly measure the radioactive gas (e.g., radon) and suspended aerosol concentration of an environment of interest by measuring changes in properties of a material as a result of the surrounding electric or magnetic field. Techniques include employing detector that utilize the aforementioned Kerr Effect, Pockel Effect and Faraday Effect for measuring changes in optical properties of certain materials (e.g., the birefringent material 502) in response to surrounding electric and/or magnetic fields.

In another embodiment, the sensor 124 (FIG. 3B) is comprised of a photo-voltaic surface such as a silicon pin diode coated with a scintillation coating that is sensitive to alpha, beta, gamma radiation or combinations thereof. The scintillation coating includes a thallium activated cesium iodide or silver activated zinc sulfide layer. The pin diode coating emits light pulses of varying intensity based on the energy of alpha or beta particles impinging upon the scintillation coating. The pulses of light generate different amplitude voltage pulses from the pin diode based on different alpha or beta energy values. The voltage pulses of different amplitude are pre-amplified and pulse shaped in such a fashion so as to allow for measurement of the peak amplitude. The peak value is quantified by an analog-to-digital (A/D) converter to produce a digital value indicating the amplitude of each pulse. The microprocessor 180 is programmed to analyze the A/D values, and to count and store the number of pulses received at each respective value. This analysis is commonly termed "pulse height analysis." The data is then displayed as a spectrum of discrete energy values by plotting the number of pulses received at each of many different amplitudes verses amplitude values. Such a spectral display presents a quantity verses energy distribution. Where the spectral energy distribution of alpha and beta particles are uniquely traceable to specific radioactive materials, the spectrum is utilized as a means to accurately discriminate between different radiation sources. As such, the radiation detection devices 100 and 300 can be made highly specific to radioactive gas such as, for example, radon.

Upon transmission of this spectral data to the testing facility 30, the data processing system 32 compares the spectral data to a known spectrum of radioactive gas of interest such as, for example, radon or other radioactive material under analysis, to verify that the data represents the material to be measured. In the event that the energy spectrum is not a match, the data is further analyzed by a qualified analysts for interpretation as to the exact source of the radiation. In the event that spectra does match the spectra of interest (e.g., the radon spectra), the data processing system 32 proceeds with the analysis of total amount of radioactive gas present at the test site. Where it is known that the amount of radioactive gas present at a specific site can vary as a function of time and other environmental conditions, it is apparent that the rate of data (spectrum) transmission from the site detector (e.g., devices 100 and 300) to the data processing system 32 at the testing facility 30 provides a time dependent series for a better understanding of the conditions and potential source of the radioactive gas.

The inventors have realized that the scintillation-photodiode combination is highly independent of other environmental conditions such as, for example, temperature, high humidity, dust and other aerosols. Further, the inventors have realized that by employing the pulse height analysis of the signals as detected by the scintillation-photodiode detector and transmitting the results in virtual real-time mode, the absolute validation of a specific radioactive gas (e.g., radon) at the assigned test site can be achieved. There is a very low probability of other interfering parameters affecting the analytical results. The inventors have realized that this function provides a significant advantage over conventional electrostatic detection methods and methods that do not implement telemetry (e.g., real time communication of test data).

Additionally, the inventors have realized that the detection hardware and methods of the present invention (as described herein) can be readily modified to analyze for radioactive components in drinking water in situ and in a location that is difficult to access physically. The present invention may, in fact, become a permanent monitoring device to assure a safe source of potable water. For example, the detector may be repackaged and designed to accommodate a different sampling configuration such as running water. Referring again to FIGS. 3A and 3B, the detectors 120 and 320 include an A/D converter 138 that is coupled to the second sensor 136 (FIG. 3A) and sensor 124 (FIG. 3B) for converting an analog signal representing, for example, the present electrostatic potential (when the second sensor 136 is a electrometer) into a digital signal. The digital signal is then passed from the detector 120 and 320 to the microprocessor 180. The microprocessor 180 may store the signal in its memory (MEM 184) or pass the signal directly to the transmitter 140 for immediate transmission to the data processing system 32. As described below, the stored digital signals may be retrieved and transmitted to the data processing system 32 in accordance with a predetermined time schedule or upon receipt of a request for transmission from the data processing system 32.

In accordance with the present invention, the transmitter 140 may be a transceiver that can receive as well as transmit messages (e.g., a device capable of bidirectional communications). As noted above, the received messages may include control signals from the data processing system 32. In one embodiment, the transmitter 140 is a conventional radiotelephone. The radiotelephone may include a feature for autodialing a predefined telephone number. The microprocessor 180 may invoke the auto-dialing feature to transmit data (e.g., test data) received as produced from the detector 120 and 320 to the data processing system 32. In this embodiment, the data processing system 32 may include programming logic such that data received over a predetermined telephone number uniquely corresponds to a particular testing location. A plurality of different testing locations may transmit data to the data processing system 32 over single telephone number or a corresponding plurality of telephone numbers. In an alternate embodiment, the results of the plurality of testing locations may be received over a single or plurality of individual frequencies by, for example, a radio frequency (RF), infrared (IR) or microwave receiver coupled to the data processing system 32.

The power supply 160 of the radioactive gas (e.g., radon) and suspended aerosol monitoring devices 100 and 300 includes a low voltage power supply 162 for coupling electronic components of the devices 100 and 300 (e.g., the transmitter 140, the microprocessor 180, the A/D converter 138, sensors 124 and 136 and the air moving device or fan 134) via a power bus 166 to an energy source 164 such as, for example, a low voltage battery. In another embodiment, the energy source 164 is AC power provided at the testing location. In this AC power embodiment, the power supply 160 includes conventional apparatus (as is known to those skilled in the art) for stepping down the AC power to a low supply voltage typically utility by portable electronic devices.

Figure 4A:
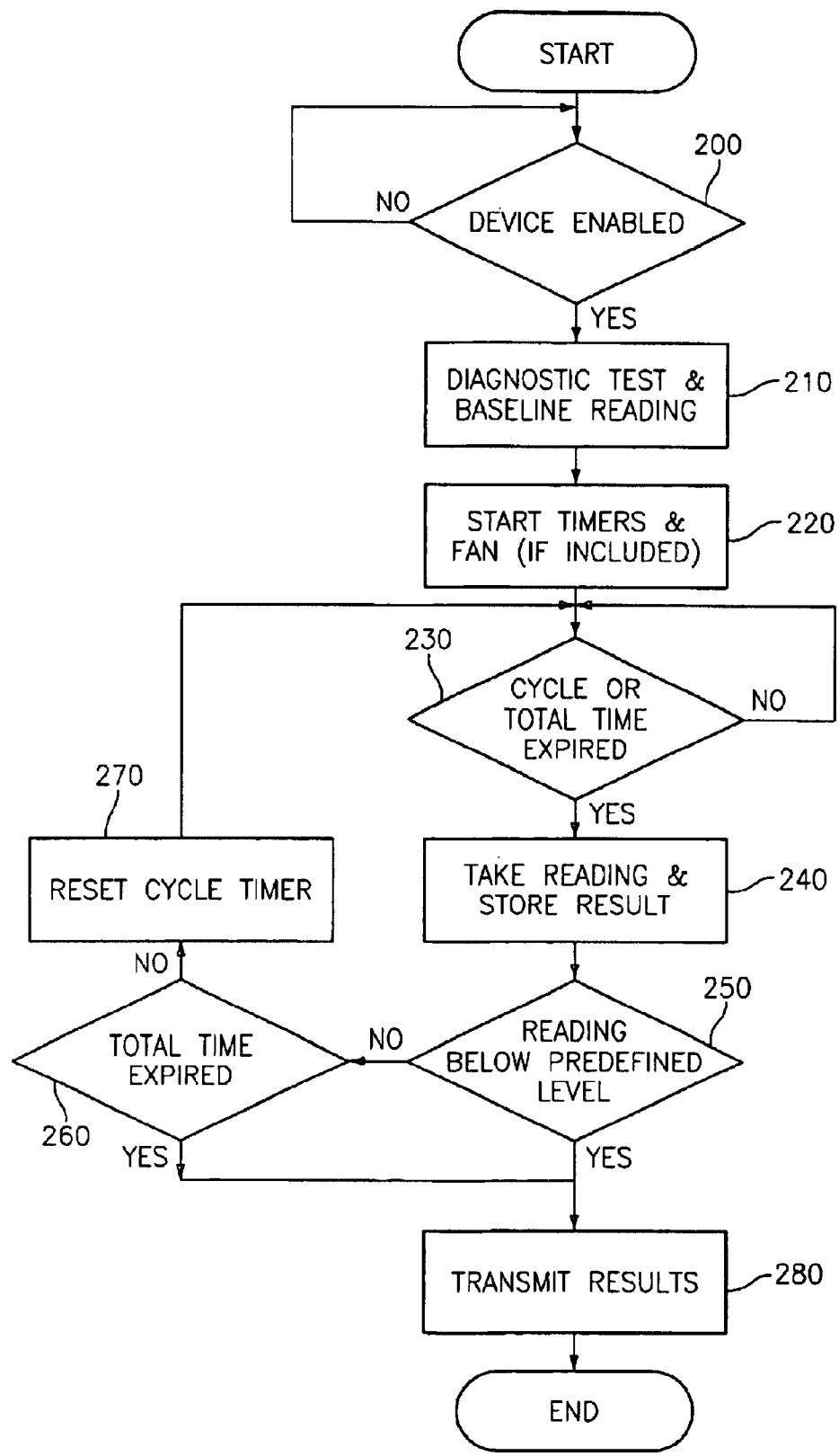
FIG. 4A is a flow diagram depicting exemplary operational processing steps of a monitoring device in accordance with one embodiment of the present invention.

FIG. 4A illustrates exemplary operational steps of a radioactive gas (e.g., radon) and suspended aerosol monitoring device configured and operating in accordance with the present invention (e.g., devices 10, 12–16, 100 and 300). A radioactive gas (e.g., radon) and suspended aerosol monitoring session begins at Block 200 with a determination as to whether the device (e.g., devices 100 and 300) is enabled and/or ready to commence a test cycle. For example, the microprocessor 180 enables the device 100 for detecting and measuring operations if a technician activates a manual key switch 182, or if an activation command is received by the devices 100 and 300 from one of the data processing systems 32 and 34.

In one embodiment, the microprocessor 180 operates in a plurality of modes, for example, a "sleep" mode, a "wake-up" mode and a "running" mode. In the sleep mode substantially all the operational features of the devices 100 and 300 are disabled. The sleep mode affords minimum power consumption and is employed, for example, prior to locating the devices 100 and 300 in a testing environment When in the wake-up mode, the microprocessor 180 performs a subset of functionality tests that include, for example, determining whether the devices 100 and 300 have received a command signal (e.g., the activation command) from one of the data processing systems 32 or 34. If the activation command is received, the microprocessor 180 enters the running mode where substantially all of the functionality of the devices 100 and 300 are enabled. It should be appreciated that the wake-up mode is similar to, for example, periodic power-up processes employed by conventional mobile communication devices where the mobile device establishes a link to a base station and queries whether an incoming message is being sent to the mobile device. It should also be appreciated that the microprocessor 180 transitions from the sleep mode into the wake-up mode in response to one of a predetermined time of the day, the expiration of a "sleep" timer or the interconnection of an operator control panel as used by a certified technician.

As described below, the running mode includes a number of sub-modes, or states, wherein some of the functionality of the devices 100 and 300 are enabled and some are disabled. For example, two such states are an active monitoring state and a passive monitoring state. In the active monitoring state the sensors 124 and 136 and the A/D converter 138 measure a voltage or a current (as described below) from impinging radiation. In the passive monitoring state the sensors 124 and 136 and the A/D converter 138 are disabled from aforementioned measuring operations. In the passive monitoring state, the chamber 122 receives radioactive gas (e.g., radon) and suspended aerosol from the testing environment through diffusion (as described above). Optionally, the microprocessor 180 instructs the air moving device 134 to maintain a substantially constant air-flow through the chamber 122 (active mode) in preparation in switching to the active mode.

When the devices 100 and 300 are enabled, the microprocessor 180 transitions from the sleep mode to the running mode. In FIG. 4A this transition is illustrated as control passing from Block 200 to Block 210. At Block 210, a plurality of diagnostic measurements are performed to assure that the monitoring devices 100 and 300 are operating properly. For example, one or is more of the following diagnostic test may be performed: (1) proper voltage values throughout the system via several points are measured; (2) for sensors including an electret, an initial charge on the electrostatic detector may be checked to ensure that it is above preset minimum value; (3) a background count above minimum acceptable level; (4) initiate simulated signals to verify proper operational A/D and microprocessor hardware and algorithms; (5) verification of communication channel (40) to data processing system at the test facility (30–32); and (6) such other tests unique to the detection system employed. Upon satisfactory completion of the diagnostic tests, a baseline or initial reading is taken. That is, the microprocessor 180 activates the A/D converter 138 to acquire an initial measurement of voltage or current values from the sensor 124 (e.g., as the system initially enters the active monitoring state). In the active monitoring state the detectors 120 and 320 measures an initial electrostatic potential of the sensors 124 and 136 (when the second sensor 136 is a electrometer). The analog signal from the sensors 124 and 136 is converted into a digital signal by the A/D converter 138 and passed to the microprocessor 180. The microprocessor 180 stores the initial baseline reading in MEM 184. Control then passes from Block 210 to Block 220.

At Block 220, the microprocessor 180 enables two timers, a cycle timer 186 and a total timer 188. The cycle timer 186 measures a period between successive readings by the sensors 124 (FIG. 3B) and 136 (FIG. 3A) in accordance with, for example, a cycle time parameter. The total timer 188 measures a total elapsed time of the testing period in accordance with, for example, a predetermined total time parameter. In accordance with the present invention, both the cycle time parameter and the total time parameter may be predetermined values (e.g., factory settings) defined within the microprocessor 180 or may be provided by the data processing system 32 when a particular test (e.g., test site specific test) is requested. The inventors have found suitable parameters to comprise, for example, a one (1) hour cycle time and a seventy-two (72) hour total time.

In accordance with one aspect of the present invention, the cycle time and total time parameters may be selected by the microprocessor 180 from a range of values stored within MEM 184. The selection process is responsive to measurements taken during the baseline process described above. For example, as illustrated in FIG. 3A, if the baseline measurement detects an initial voltage of the sensor 124 that indicates that the sensor 124 may be somewhat depleted (or the scintillation sensor is active due to high levels of radon), the testing period (e.g., total time parameter) and frequency (e.g., cycle time parameter) may be adjusted in an attempt to ensure that an accurate test process can be performed before the sensor 124 (or scintillation sensor) becomes unreliable. For example, the cycle time parameter may be set to equal ten (10) minutes versus a typical one (1) hour time, and the total time parameter may be set to equal twenty-four (24) hours versus a typical seventy-two (72) hour testing period.

As should be appreciated, once the voltage of the sensor 124 decreases below a certain level (e.g., when the sensor 124 is comprised of an electret) or a threshold value is exceeded (e.g., when the sensor 124 is comprised of a scintillation detector), detected subsequent changes in voltage or current may be out of range and consequently unreliable. The inventors have realized that when the sensor 124 is comprised of a photodiode scintillation sensor (e.g., the embodiment illustrated in FIG. 3B versus the electret sensor of FIG. 3A) certain advantages may be realized. For example, the scintillation sensor provides: 1.) measurement stability over long time periods; 2.) value readings that are independent of excessive moisture, temperature and mechanical shock; 3.) an ability to identify a radiation source for positive verification and resolution of final quantitative values; and 4.) an ability to collect "time-of-day" radiation data to study daily changes or quantify data for periods when the site is occupied In one embodiment, the devices 100 and 300 perform a calibration cycle prior to the aforementioned baseline reading (e.g., at Block 210). In the calibration cycle, the microprocessor 180 activates the sensor 124 and the A/D converter 138 to read the sensor 124 (e.g., the electret 124 of FIG. 3A or the scintillation sensor of FIG. 3B). The results of this calibration reading are passed to the microprocessor 180, which immediately transmits them to the data processing system 32 via the transmitter 140. The calibration reading is received and processed by the data processing system 32 such that an initial measurement of the radioactive gas (e.g., radon) concentration within the environment of interest may be determined. From this initial calibration reading, the data processing system 32 determines a set of parameters that attempt to ensure highly accurate test results. Should the initial data measurements indicate a faulty detection system or be so far out of normal (anticipated) range, immediate notification is provided to a certified analyst at a remote testing facility such that early corrective action may be initiated. For areas under test that are known to contain radioactive materials (or other potentially hazardous material being monitored), this notification could initiate immediate removal of personnel potentially exposed to excessive levels of either radiation or hazardous materials. The set of parameters (e.g., preferred data collection cycle, diurnal cycle, and total time parameters) are then transmitted from the data processing system 32 to the device 100 and 300. The microprocessor 180 receives the set of preferred parameters and adjusts the operation of the device 100 and 300 accordingly. Once the calibration process is complete (e.g., the reading results are transmitted to and the preferred parameters are received from the data processing system 32), the aforementioned baseline reading is performed and operation continues utilizing the preferred cycle time and total time parameters.

Referring again to Block 220, in addition to enabling the two timers 186 and 188, the microprocessor 180 activates the air movement device 134 (e.g., the air moving device) to regulate the air-flow through the chamber 122 during the testing period. Once the fan 134 is activated, the microprocessor 180 enters the passive monitoring state. In the passive monitoring state, the microprocessor 180 disables the sensors 124 and 136 and the A/D converter 138, but the timers 186 and 188 and fan 134 remain enabled. The microprocessor 180 monitors the timers and compares the elapsed time to the values of the cycle time and the total time (Block 230). The microprocessor 180 remains in the passive monitoring state until the elapsed time as measured by the cycle timer 186 and the total timer 188 equals one of the cycle time parameter or the total time parameter. When one of these conditions is met, control passes from Block 230 to Block 240 where the microprocessor 180 enters the active monitoring state. At Block 240, the microprocessor 180 enables the sensors 124 and 136 and the A/D converter 138 so that another voltage or current reading is taken. The results of the reading are passed to the microprocessor 180 and, preferably, stored in MEM 184.

At Block 250, the results of the measurement taken at Block 240 are compared to a predefined termination point. For example, a step of the baseline reading process performed at Block 210) preferably includes calculating a specified percentage of the initial baseline reading. For example, in the embodiment wherein the sensor 124 includes an electret (FIG. 3A), a seventy-five percent (75%), fifty percent (50%) or other predetermined percentage of the baseline voltage or current may be set to the predefined termination point value. Once the measured voltage or current of the sensor 124 equals the termination point value, the testing period is completed as the inventors have determined that an accurate radioactive gas (e.g., radon) and suspended aerosol concentration may be calculated from data collected over the drop from an initial level (baseline reading) to the reading of the predetermined percentage of the baseline (e.g., the aforementioned 75%, 50%, etc. readings).

Figure 4B:
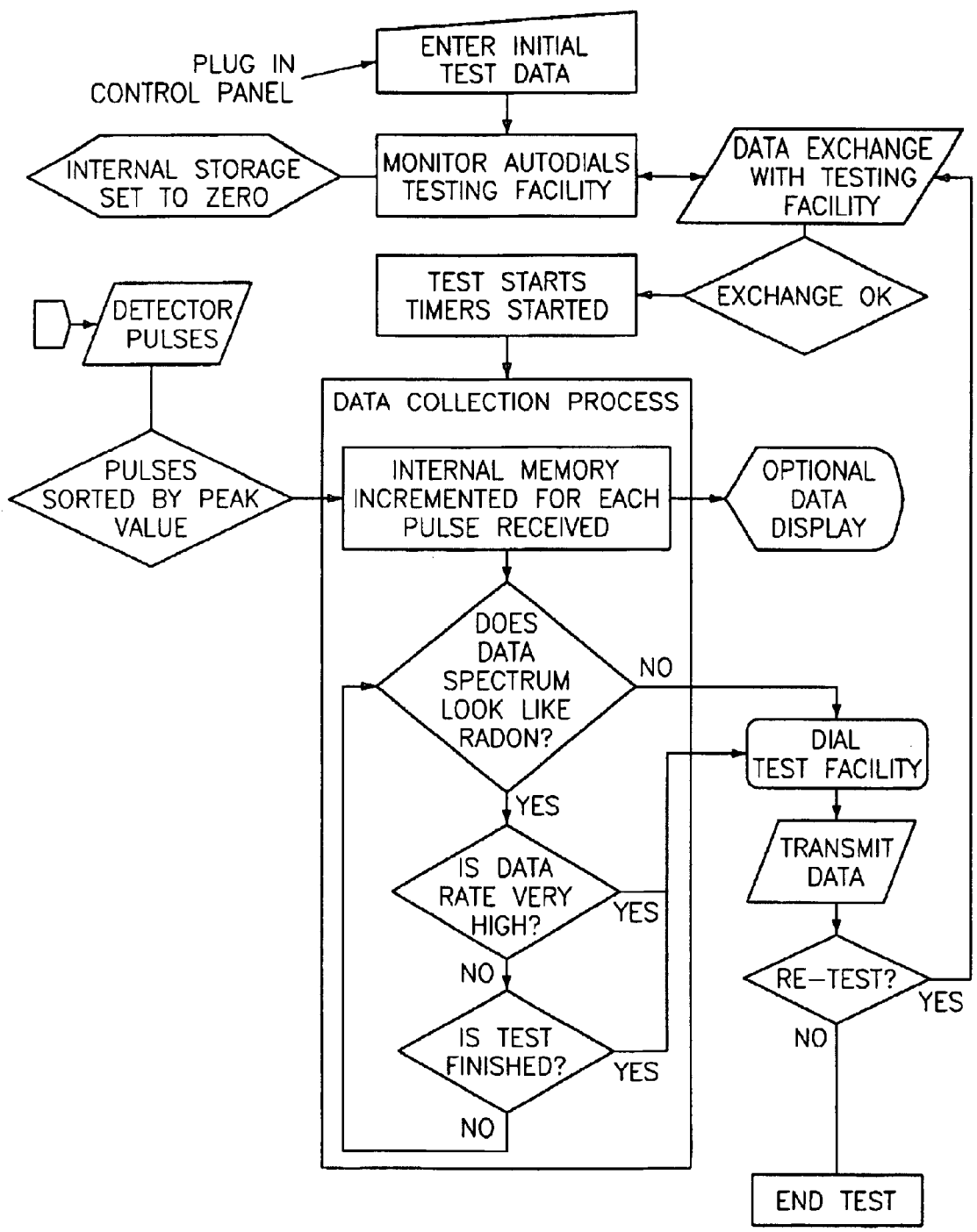
FIG. 4B is a flow diagram depicting other exemplary operational processing steps of a monitoring device in accordance with one embodiment of the present invention.

However, if the measurements taken at Block 240 do not equal the predefined termination point, control passes from Block 250 to Block 260 where the total time parameter is compared to the value of the total time timer 188. The testing period also completes if the value of the total time timer 188 equals the predefined total time for monitoring (e.g., the total time parameter). If not, control passes from Block 260 to Block 270 where the cycle timer is reset to a value of zero (0). The microprocessor 180 then transitions the device 100 and 300 into the passive monitoring state. The transition is illustrated in FIG. 4B as control passing from Block 270 back to Block 230. The testing cycle continues and repeats as described above with reference to Blocks 230–270.

It should be appreciated that the present invention contemplates other methods for regulating the testing cycle illustrated in Blocks 230–270. For example, the microprocessor 180 may repeat the cycle for a predetermined or user-defined number (N) of cycles. The N cycles yield a fixed number of voltage or current data points, for example, N+1 data points including the baseline and the N measurements. Additionally, the microprocessor 180 may receive a control signal from the data processing system that initiated the monitoring (e.g., systems 32 or 34). The control signal may include a request to halt monitoring and to transmit the measurements stored in the MEM 184.

Referring again briefly to Blocks 250 and 260, the testing cycle completes when a measured voltage or current is below a predefined level (Block 250) or if a total testing time has expired (Block 260). On either of these conditions, control passes to Block 280. At Block 280, the microprocessor 180 retrieves the baseline reading and previous readings taken at Blocks 210 and 240, respectively. The microprocessor 180 formats the retrieved readings and transmits them to the data processing system 32 or 34 that initiated the testing period. In accordance with the present invention, the formatted transmission of the readings may include data accuracy and/or security features. For example, the formatted transmission of data preferably includes check sum error control (as is generally known for transmission of data over wired and/or wireless communication connections). If a check sum error is detected, the data processing system 32 or 34 may request that the microprocessor 180 retransmit the readings. The security features may include, for example, signal encryption to substantially prevent interception and inappropriate use of the monitoring data.

Once transmission operations and retransmission operations (if any) are completed, the testing cycle is completed. The microprocessor 180 transitions from the active monitoring state to the sleep mode. As noted above, the microprocessor 180 awaits further instruction from the data processing systems 32 or 34 by initiating periodic or interrupt-driven wake-up mode operations. For example, the data processing system 32 or 34 that initiated the test may conclude that additional testing may be required to eliminate an inaccuracy or, alternatively, the devices 100 and 300 may be reused within the testing environment at a later time.

With respect to this later use, it is within the scope of the present invention for the radioactive gas (e.g., radon) and suspended aerosol monitoring devices described herein (e.g., devices 10, 100, 300, and the like) to include a means for sealing the chamber 122 to substantially prevent radioactive gas (e.g., radon) and suspended aerosol or other gases from entering the chamber 122 during the sleep mode. The inventors have realized that this feature may be desirable when the sensor 124 includes an electret (FIG. 3A).

FIG. 4B illustrates one operational flow of a monitoring device configured and operating in accordance with one embodiment of the present invention. Another exemplary operation flow of the monitoring device configured and operating in accordance with the present invention is illustrated by the following:

1. Technician places monitoring device in area to be measured.
2. The technician activates the monitoring device by utilizing a unique "switch key" 182 to initiate a test.
   a. Microprocessor 180 "wakes up" and acquires initial sensor reading.
   b. On expiration of a cycle timer the microprocessor 180 takes second reading, the timer expires after "X" number of hours, for example, 2 hours.
   c. The cycle (2a–2b.) repeats for "N" readings, for example, 10 readings.
3. After last reading, the microprocessor 180 initiates a dial-up radiotelephone communication connection (via a specified telephone number) to the data processing system.
   a. After hand-shake and security validations, the microprocessor 180 transfers reading data with check sum error control to the data processing system.
   b. Remote computer station (e.g., the data processing system) accepts data or "requests" a re-transmission to eliminate a detected error.
   c. The microprocessor 180 shuts down and enters the sleep mode.
4. Remote computer station performs appropriate calculations (e.g., decay calculations) based upon multiple data points and type of detector utilized (e.g., the data from the N readings).
5. Data is calculated to determine in picocuries per liter (pCi/L) an activity or concentration of radioactive gas (e.g., radon) and/or hazardous materials within the monitored area's atmosphere.
6. End user either disposes of the monitoring device or returns the device to an appropriate location for re-use and/or recharging for re-use.

In one embodiment a radioactive gas and suspended aerosol detecting and monitoring device of the present invention includes auto logging capability from initialization to the final signal without any possible outside intervention of human sources to ensure the integrity of the testing procedures. Other features of the present invention include, but are not limited to: 1). the retention of data as a time dependant series of information for transmission to a remote site; 2). control of communication between the monitoring system device and the remote monitoring site; 3). perform internal diagnostics to assure proper operation; 4). measure and accumulate the electrical pulses using pulse height analysis; 5). a bidirectional telemetry package such as a digital radio telephone or the like to be able to diagnose and/or terminate or extend device monitoring after a given amount of time; 6). an external control panel for ease of operation; 7) a low voltage battery supply, 8). provide an accurate time base; and 9). auto zeroing at the start of a new test cycle.

Although described in the context of preferred embodiments, it should be realized that a number of modifications to these teachings may occur to one skilled in the art. By example, and as discussed above, the teachings of this invention are not intended to be limited to any specific application, that is, the invention is not intended to be utilized only as a radon monitoring device, other radioactive or chemistries and/or physical properties may be detected and measured with devices and operating methods described herein. For example, another application of the present invention includes use of the monitoring devices (as described herein) as a medical monitor for chemical or radioactive substances in an organism. In this respect, the medical monitor may be surgically implanted It should also be appreciated that the transmitter 140 may be a transceiver such as, for example, a conventional radiotelephone or the like.

Further, it should be appreciated that while one embodiment of the monitoring device of the present invention have been described as employing a sensor 124 having an electret within an ionization chamber (e.g., chamber 122 of FIG. 3A) other radioactive gas (e.g., radon) and suspended aerosol collecting/capturing devices such as, for example, scintillation detectors and electronic alpha or gamma detectors may be utilized within the chamber 122 (e.g., as illustrated in FIG. 3B).

For example, in one embodiment the sensor 124 is replaced by an assembly having a polymeric material (plastic) such as a poly D-p-phenylenevinylene. The polymeric material emits light when subjected to an electric field or when placed between two electrodes of opposite charge. Accordingly, the chamber 122 includes an assembly having a first positively charged plate or layer, a second negatively charged plate or layer, and the aforementioned polymeric material disposed therebetween The greater the charge or voltage between the two plates, the greater amount of light that is emitted by the sandwiched polymeric material. In this embodiment, the sensor 136 is comprised of a miniature multiplying phototube, photocell or photodiode that is disposed along the polymeric material. The photodiode reads an amount of light emitted by the assembly and converts the light into a signal representing a voltage or current within the assembly. Successive measurements of the light over a testing period yields data points representing the decay of the electric field due to exposure to the radioactive gas (e.g., radon) and suspended aerosol within the atmosphere of the chamber 122. One benefit of the multiplying phototube detector is an ability for amplifying any small changes in electric field between the two opposite charged plates due to the neutralization of charges by alpha and beta particles caused by the decaying radioactive gas (e.g., radon) and suspended aerosol. The amplification provides for much shorter reading periods due to much higher sensitivities.

In another embodiment, the sensor 124 includes an assembly having a first positively charged plate, a second negatively charged plate and one of a number of polymeric plastics such as a polythiophene, a polypyrrole, a polyacetylene and a polyaniline. A non-contact volt or current meter probe is placed between the two charged plates to detect a decay in the electric field due to sustained exposure to the decaying radioactive gas (e.g., radon) and suspended aerosol within the chamber 122. One benefit of the polymeric plastics described above is that these materials exhibit an ability to amplify a redox reaction between the combination of alpha or beta particles and the charged plastic plates. Amplification of these redox coupled reactions enables a higher sensitivity and thus shorter measuring or reading periods for an accurate result.

In another embodiment, the sensor 124 includes an assembly having a scintillation detector, which resolves alpha and/or beta energies for qualitative purposes and produces electrical pulses proportional by rate to the amount of radon present at the site. The amplitude of the pulses represents the actual energy impinged by each particle. By measuring the number of pulses within a selected amplitude range, highly material specific data may be derived.

While the invention has been particularly shown and described with respect to preferred embodiments thereof, it will be understood by those skilled in the art that changes in form and details may be made therein without departing from the scope and spirit of the invention.

What is claimed is:

1. A system for detecting and measuring one of a concentration of physical and chemical properties of a target material within an environment of interest, said system comprising:
   a testing facility having a data processing system disposed therein; and
   a monitoring device disposed within said environment of interest and operatively coupled to said data processing system, said monitoring device comprising:
      a detector having a housing defining a chamber, a collector disposed in said chamber and a sensor electrically coupled to said collector, said housing having at least one opening for allowing said target material within said environment of interest to enter said chamber, said collector for measuring one of a number of ions and gamma radiation generated by a decay of said target material within said chamber, and said sensor for selectively measuring changes in an electrostatic potential of said collector in response to an accumulation of said generated ions and said gamma radiation;
      a transmitter for transmitting said measured changes in said electrostatic potential to said data processing system; and
      a receiver for receiving signals from said data processing system, said signals including parameters employed by said sensor in said selective measuring;
      wherein said data processing system selects said parameters from a plurality of parameters in accordance with said concentration of said target material determined by said data processing system from previously transmitted measured changes in said electrostatic potential.

2. The system as set forth in claim 1 wherein said parameters include a frequency at which said electrostatic potential are measured and a total duration of said measuring.

3. The system as set forth in claim 2 wherein said monitoring device includes a memory device for storing a plurality of electrostatic measurements taken at time periods corresponding to said frequency.

4. The system as set forth in claim 1 wherein said collector is comprised of an electret including two oppositely charged conductive surfaces, said surfaces forming an electric field therebetween.

5. The system as set forth in claim 1 wherein said sensor is comprised of one of an electrometer, a non-surface contact electrostatic probe and a scintillation crystal.

6. The system as set forth in claim 1 wherein said housing includes a second opening and wherein said detector includes an air movement device disposed within said second opening, said air movement device for circulating an atmosphere within said chamber to provide a substantially constant air-flow within said chamber.

7. A system for detecting and measuring one of a concentration of physical and chemical properties of a target material within an environment of interest, said system comprising:
   a testing facility having a data processing system disposed therein; and
   a monitoring device disposed within said environment of interest and operatively coupled to said data processing system, said monitoring device comprising:
      a detector having a housing defining a chamber, a collector disposed in said chamber and a sensor electrically coupled to said collector, said housing having at least one opening for allowing said target material within said environment of interest to enter said chamber, said collector for detecting target chemical compounds within said chamber, and said sensor for selectively measuring integrated electrical signals of said collector in response to an accumulation of said chemical compounds;
      a transmitter for transmitting said measured changes in said electrostatic potential and/or integrated electrical signals to said data processing systems; and
      a receiver for receiving signals from said data processing system, said signals including parameters employed by said sensor in said selective measuring;
      wherein said data processing system selects said parameters from a plurality of parameters in accordance with said concentration of said target material determined by said data processing system from previously transmitted measured changes in said electrostatic potential and/or said integrated electrical signals.

8. The system as set forth in claim 7 wherein said collector is comprised of a scintillation counter.

9. A system for detecting and measuring a concentration of one of radioactive gas, suspended aerosol and non-radioactive gaseous chemistries within an environment of interest, said system comprising:

a testing facility having a data processing system disposed therein; and a monitoring device disposed within said environment of interest and operatively coupled to said data processing system, said monitoring device comprising:

a detector having a housing defining a chamber and a sensor disposed in said chamber, said housing having at least one opening for allowing said radioactive gas, said suspended aerosol particles and said chemistries within said environment of interest to enter said chamber, said sensor including a material disposed within one of an electric and magnetic field formed within said sensor, said material having optical properties that vary in response to changes in said field, wherein changes over time of said optical properties is representative of changing field strengths; and a transmitter for transmitting said changing field strength to said data processing system.

10. The system as set forth in claim 9 wherein said material includes a first end and a second end and said sensor includes:

a first surface;

a second surface;

wherein one of said electric and magnetic field is formed between said first surface and said second surface;

a light source disposed at said first end of said material, said light source emitting a beam that travels through said material from said first end to said second end; and a beam detector disposed at said second end of said material, said beam detector for detecting a location of said beam exiting said material;

wherein changes over time of said detected beam location represents changes in said field strength.

11. A monitoring system for measuring a concentration of one of a radioactive gas, radioactive aerosol particles and non-radioactive gaseous chemistries within an environment of interest, said system comprising:

a data processing system having programming logic for determining said concentration of said radioactive gas, said radioactive aerosol particles and said non-radioactive gaseous chemistries from a plurality of data points; and a programmable monitoring device coupled to said data processing system by a communication network, said monitoring device comprising:

a sensor having a housing defining a chamber and a collector for collecting ions generated by a decay of said radioactive gas, said radioactive aerosol particles and said non-radioactive gaseous chemistries within said chamber, said housing having at least one opening for allowing said radioactive gas, said radioactive aerosol particles and said non-radioactive gaseous chemistries within said environment of interest to enter said chamber;

a detector for selectively measuring changes in an electrostatic potential of said collector in response to an accumulation of said generated ions;

a transmitter for transmitting said measured changes in said electrostatic potential to said data processing system, said measured changes corresponding to said plurality of data points; and a receiver for receiving signals from said data processing system, said signals including parameters employed by said sensor in said selective measuring;

wherein said data processing system selects said parameters from a plurality of parameters in accordance with said concentration of said target material determined by said data processing system from previously transmitted measured changes in said electrostatic potential.

12. The monitoring system as set forth in claim 11 wherein said parameters include a frequency at which said electrostatic potential corresponding to different alpha particle energies is measured and a total duration of said measuring.

13. A method for detecting and measuring one of a concentration of a radioactive gas and suspended radioactive aerosols within an environment of interest, comprising:

providing a housing defining a chamber;

providing a sensor disposed in the chamber, the sensor including a material having optical properties that vary in response to changes in one of an electric and magnetic field;

allowing the radioactive gas and the suspended radioactive aerosols to diffuse into the chamber;

forming one of an electric and magnetic field about the material;

decreasing a strength of the field in proportion to ions generated by a decay of the radioactive gas and suspended radioactive aerosols;

selectively measuring a change in the strength of the field by measuring changes in the optical properties of the material; and transmitting the measurements of the changing field strength to a data processing system having programming logic for calculating the concentration of the radioactive gas and suspended radioactive aerosols from the transmitted measurements.

* * * * *